US010397943B2

United States Patent
Liu

(10) Patent No.: US 10,397,943 B2
(45) Date of Patent: Aug. 27, 2019

(54) FLEXIBLE NAN AVAILABILITY SCHEDULE INDICATIONS

(71) Applicant: Apple Inc., Cupertino, CA (US)

(72) Inventor: Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 15/711,255

(22) Filed: Sep. 21, 2017

(65) Prior Publication Data
US 2018/0092119 A1 Mar. 29, 2018

Related U.S. Application Data

(60) Provisional application No. 62/398,690, filed on Sep. 23, 2016.

(51) Int. Cl.
| | |
|---|---|
| *H04W 72/12* | (2009.01) |
| *H04W 48/16* | (2009.01) |
| *H04W 84/18* | (2009.01) |
| *H04W 28/18* | (2009.01) |
| *H04W 8/00* | (2009.01) |
| *H04W 84/12* | (2009.01) |

(52) U.S. Cl.
CPC ....... *H04W 72/1278* (2013.01); *H04W 48/16* (2013.01); *H04W 8/005* (2013.01); *H04W 28/18* (2013.01); *H04W 84/12* (2013.01); *H04W 84/18* (2013.01)

(58) Field of Classification Search
USPC ........................................................ 370/252
See application file for complete search history.

(56) References Cited

U.S. PATENT DOCUMENTS

| | | | | |
|---|---|---|---|---|
| 2009/0124301 A1* | 5/2009 | Raissinia | .......... | H04W 52/0216 455/574 |
| 2009/0276494 A1* | 11/2009 | Canova, Jr. | .......... | G06Q 10/109 709/205 |
| 2011/0296006 A1* | 12/2011 | Krishnaswamy | ....... | H04L 45/00 709/224 |
| 2012/0051240 A1* | 3/2012 | Dwivedi | ............... | H04W 76/14 370/252 |
| 2013/0294232 A1* | 11/2013 | Segev | ................... | H04W 28/06 370/230 |
| 2014/0314049 A1* | 10/2014 | Cho | ........................ | H04L 5/006 370/332 |

(Continued)

*Primary Examiner* — Phong La
(74) *Attorney, Agent, or Firm* — Meyertons Hood Kivlin Kowert and Goetzel PC; Jeffrey C. Hood; Brian E. Moore

(57) ABSTRACT

Embodiments relate to wireless stations that operate to configure direct communication between the wireless stations without utilizing an intermediate access point. In embodiments, a wireless station may transmit, to a first peer wireless station, a first availability schedule that may include one or more types of committed availability and receive, from the first peer wireless station, a second availability schedule applicable to the wireless station but not other peer wireless stations. The types of committed availability may include a first type that is non-cancelable and a second type that is cancelable. The second availability schedule may be the second type. The wireless station may be further configured to transmit, to a second peer wireless station of the plurality of peer wireless stations, a third availability schedule where the third availability schedule may be the first type.

20 Claims, 11 Drawing Sheets

(56) References Cited

U.S. PATENT DOCUMENTS

| | | | |
|---|---|---|---|
| 2015/0139203 A1* | 5/2015 | Miryala | H04W 28/0263 |
| | | | 370/338 |
| 2016/0174136 A1 | 6/2016 | Patil et al. | |
| 2016/0249200 A1* | 8/2016 | Liu | H04W 8/005 |
| 2016/0270069 A1* | 9/2016 | Huang | H04W 74/006 |
| 2016/0270137 A1* | 9/2016 | Yong | H04W 8/005 |
| 2016/0278112 A1 | 9/2016 | Liu et al. | |
| 2016/0286398 A1* | 9/2016 | Abraham | H04L 63/065 |
| 2017/0245296 A1 | 8/2017 | Huang et al. | |
| 2017/0311341 A1 | 10/2017 | Patil et al. | |
| 2017/0339680 A1* | 11/2017 | Jia | H04W 28/02 |

* cited by examiner

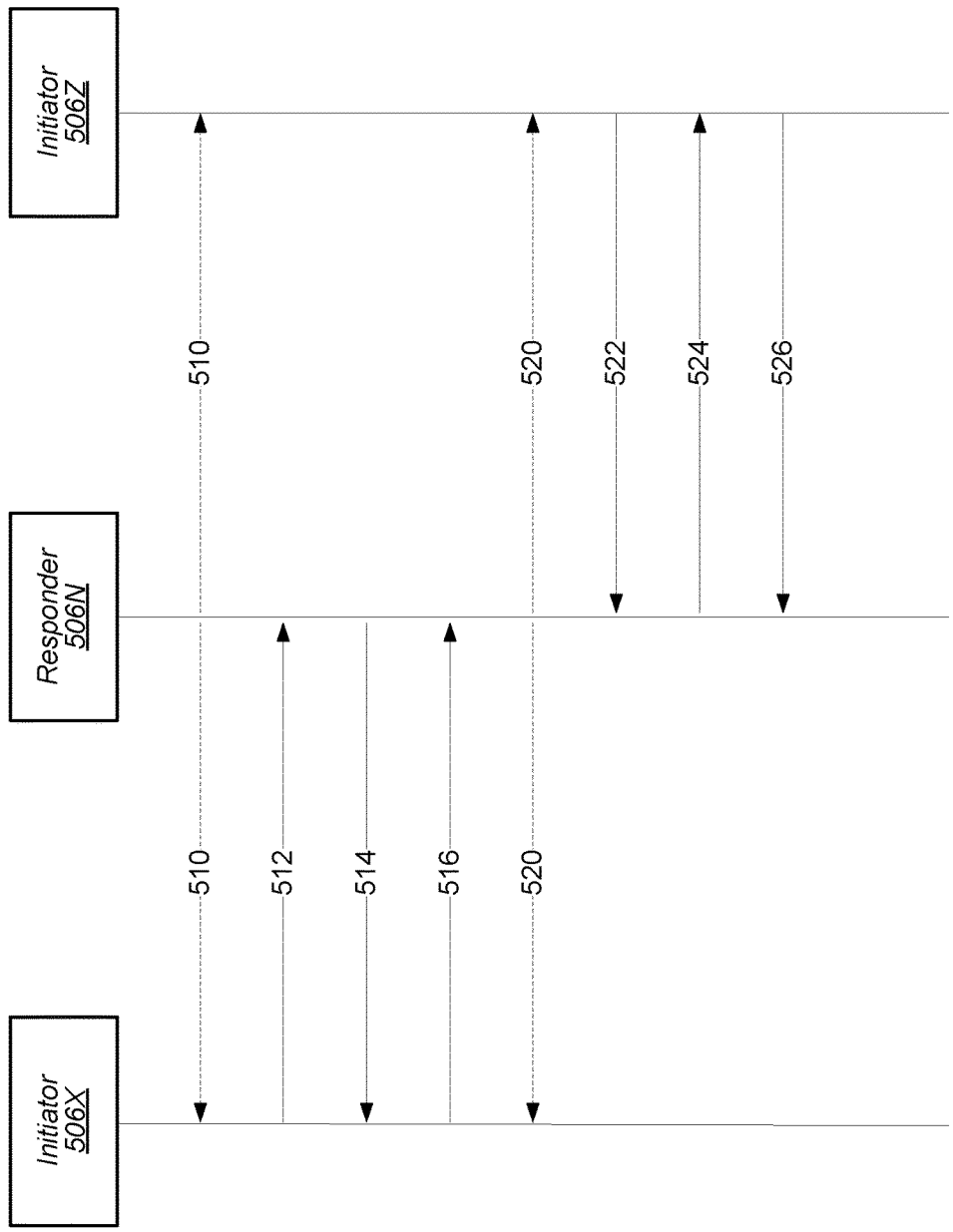

FLEXIBLE NAN AVAILABILITY SCHEDULE INDICATIONS

PRIORITY DATA

This application claims benefit of priority to U.S. Provisional Application Ser. No. 62/398,690, titled "Flexible NAN Availability Schedule Indications," filed Sep. 23, 2016, by Yong Liu, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and/or multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, a device that wirelessly connects to other devices is referred to as a "station" or STA, "mobile station", "user device" or "user equipment" or UE for short. Wireless stations can be either wireless Access Points (APs) or wireless clients (or mobile stations). APs, which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices, such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Embodiments described herein relate to systems and methods for flexible NAN availability schedule indications.

Some embodiments described herein relate to systems and methods for peer wireless stations (e.g., wireless stations configured to communicate with neighboring wireless stations without utilizing an intermediate access point) to exchange flexible NAN availability schedule indication.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein. In some embodiments, one or more wireless stations operate to configure direct communication with neighboring mobile stations, e.g., direct communication between the wireless stations without utilizing an intermediate access point.

In some embodiments, a wireless station (or a processor, processing element, and/or baseband processor wireless station) may be configured to transmit, to a first peer wireless station of a plurality of peer wireless stations within transmission range of the wireless station, a first availability schedule that may include one or more types of committed availability and receive, from the first peer wireless station, a second availability schedule applicable to the wireless station but not other peer wireless stations. The types of committed availability may include a first type of committed availability that is non-cancelable and a second type of committed availability that is cancelable. The second availability schedule may be the second type of committed availability. The wireless station may be further configured to transmit, to a second peer wireless station of the plurality of peer wireless stations, a third availability schedule where the third availability schedule may be the first type of committed availability.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 5 illustrates an example of schedule negotiations for a peer-to-peer communication session, according to embodiments.

Figure 1:
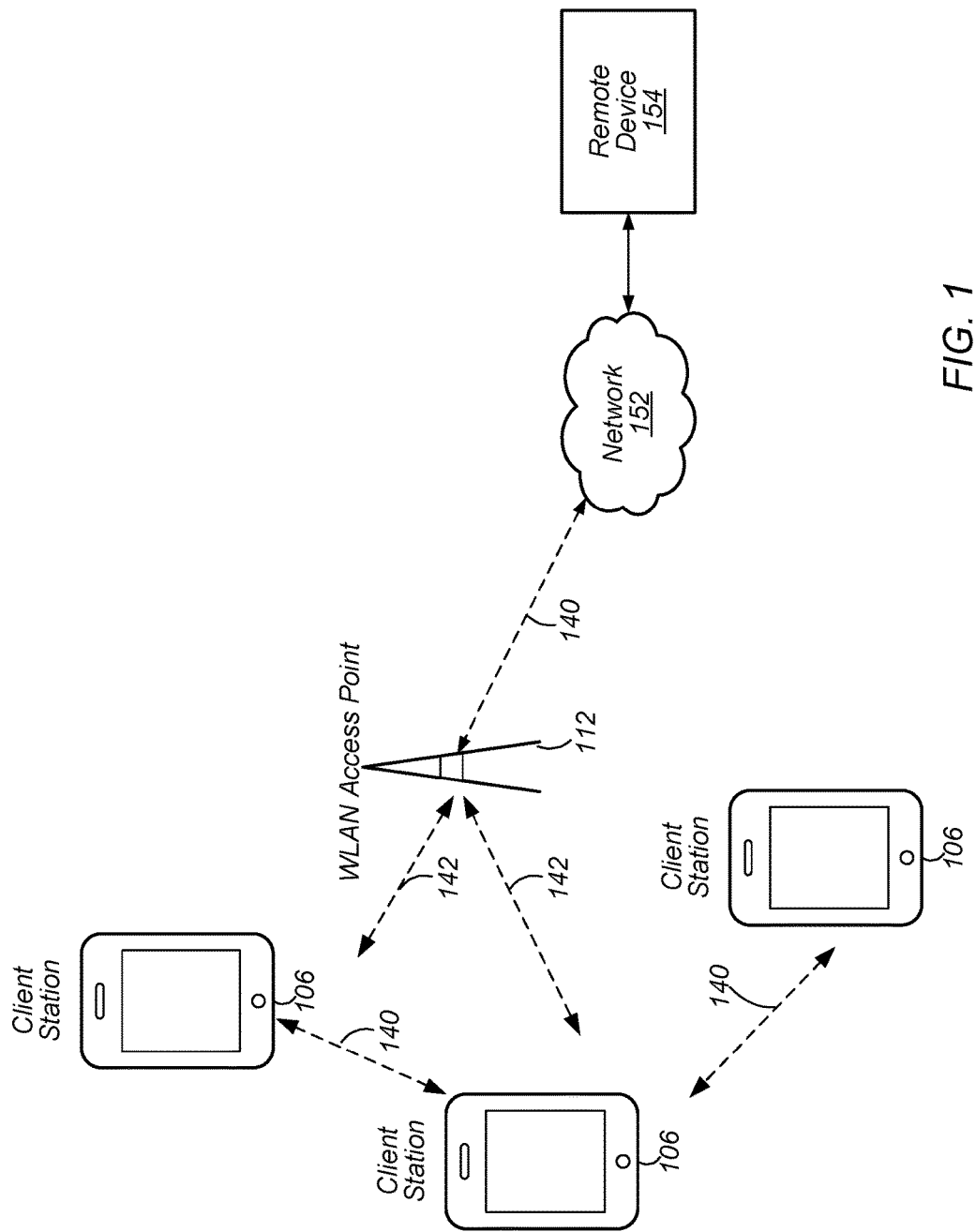
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to transmit, to a first peer wireless device of a plurality of peer wireless devices within transmission range of the wireless device, a first availability schedule that may include one or more types of committed availability and receive, from the first peer wireless device, a second availability schedule applicable to the wireless device but not other peer wireless devices. The types of committed availability may include a first type of committed availability that is non-cancelable and a second type of committed availability that is cancelable. The second availability schedule may be the second type of committed availability. The wireless device may be further configured to transmit, to a second peer wireless device of the plurality of peer wireless devices, a third availability schedule where the third availability schedule may be the first type of committed availability.

Figure 2:
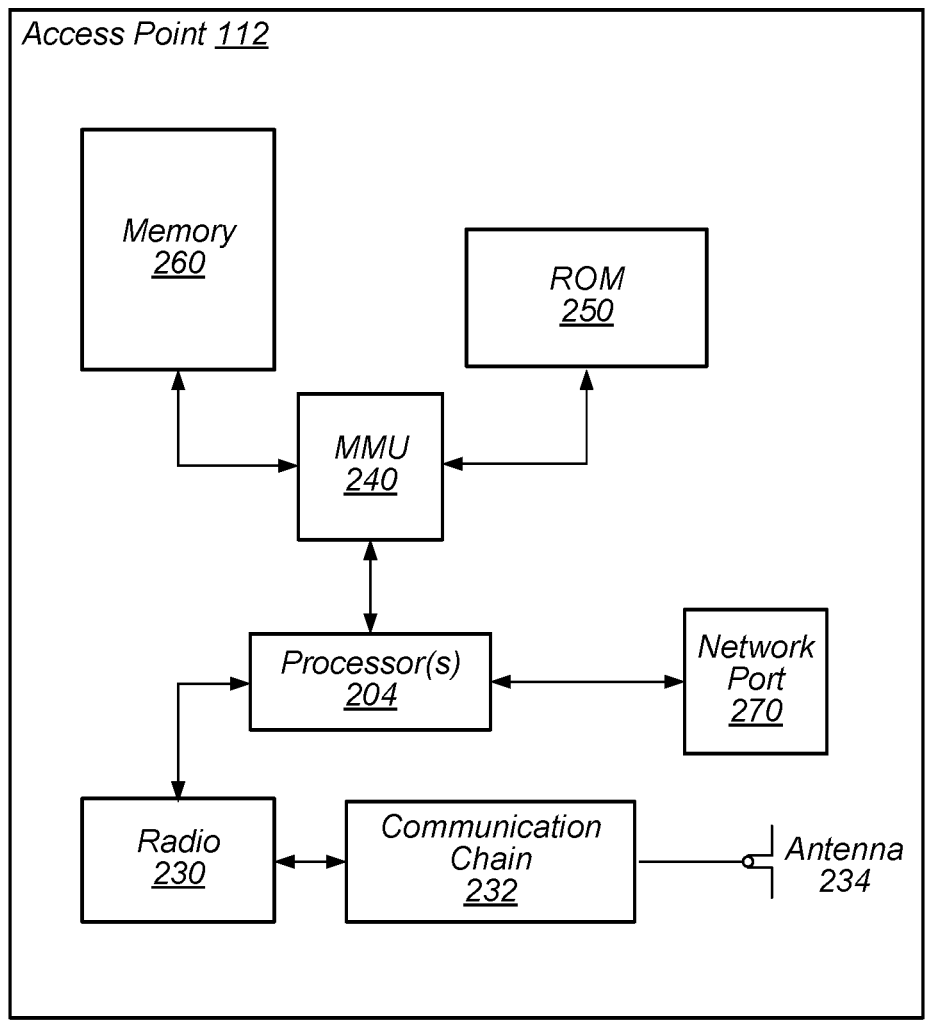
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to transmit, to a first peer wireless station of a plurality of peer wireless stations within transmission range of the wireless station, a first availability schedule that may include one or more types of committed availability and receive, from the first peer wireless station, a second availability schedule applicable to the wireless station but not other peer wireless stations. The types of committed availability may include a first type of committed availability that is non-cancelable and a second type of committed availability that is cancelable. The second availability schedule may be the second type of committed availability. The AP 112 may be further configured to transmit, to a second peer wireless station of the plurality of peer wireless stations, a third availability schedule where the third availability schedule may be the first type of committed availability.

Figure 3:
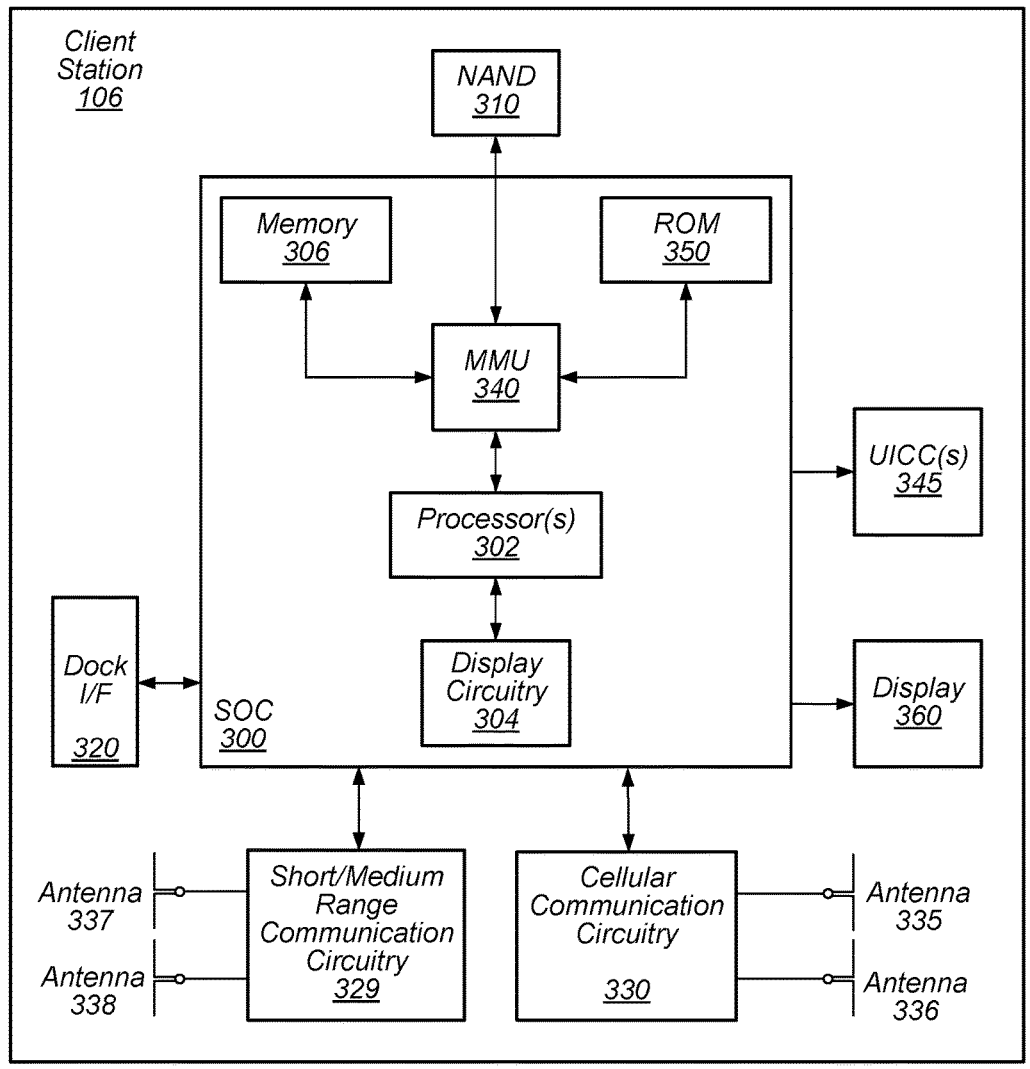
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to transmit, to a first peer client station of a plurality of peer client stations within transmission range of the client station, a first availability schedule that may include one or more types of committed availability and receive, from the first peer client station, a second availability schedule applicable to the client station but not other peer client stations. The types of committed availability may include a first type of committed availability that is non-cancelable and a second type of committed availability that is cancelable. The second availability schedule may be the second type of committed availability. The client station may be further configured to transmit, to a second peer client station of the plurality of peer client stations, a third availability schedule where the third availability schedule may be the first type of committed availability.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for flexible NAN availability schedule indications.

Flexible Availability Schedule Indications

Figure 4A:
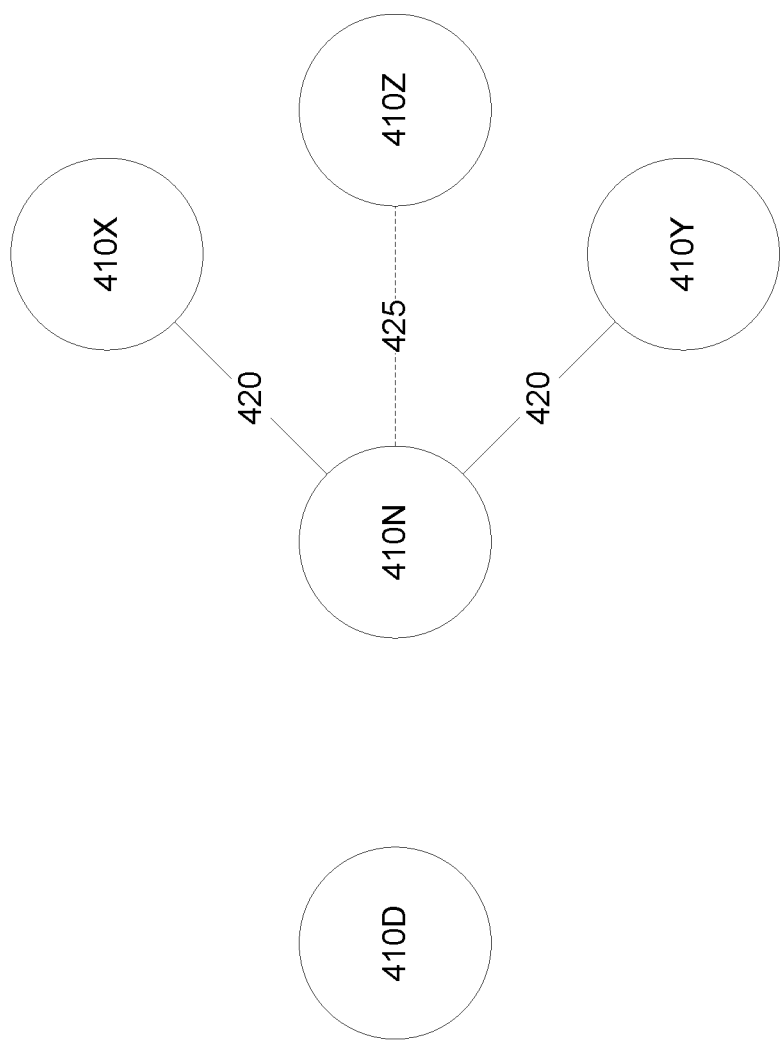
FIG. 4A illustrates an example of a device maintaining and establishing data links with peer devices.

In some existing implementations, e.g., as FIG. 4A illustrates, a device (e.g., device 410N) may have active peer-to-peer communication sessions 420 (e.g., data links and/or NAN data links (NDLs)) with one or more neighboring peer devices (e.g., devices 410X and 410Y). In addition, device 410N may be establishing a new peer-to-peer communication session with an additional neighboring peer device (e.g., device 410Z) and/or updating (scheduling for) an established peer-to-peer communication session 425 with the additional neighboring peer device to accommodate a new service (e.g., a new datapath and/or NAN datapath). Additionally, there may be further additional neighboring peer devices (e.g., device 410D) attempting to discover services from device 410N (e.g., prior to attempting to establish a peer-to-peer communication session). Device 410N (as further illustrated by FIG. 4B) may advertise three types of availability for receiving a transmission—potential availability, committed availability, and/or conditional availability. Potential availability may refer to time windows and channels for receiving transmissions that are either preferred or not preferred. Committed availability may refer to committed (e.g., previously scheduled) time windows and channels for receiving communications. Conditional availability may refer to proposed time windows and channels for communication with a peer and may become committed if the peer accepts the proposal (either entirely or partially). Note that conditional availability may only be included in setup and/or negotiation messages for a peer-to-peer communication session.

Figure 4B:
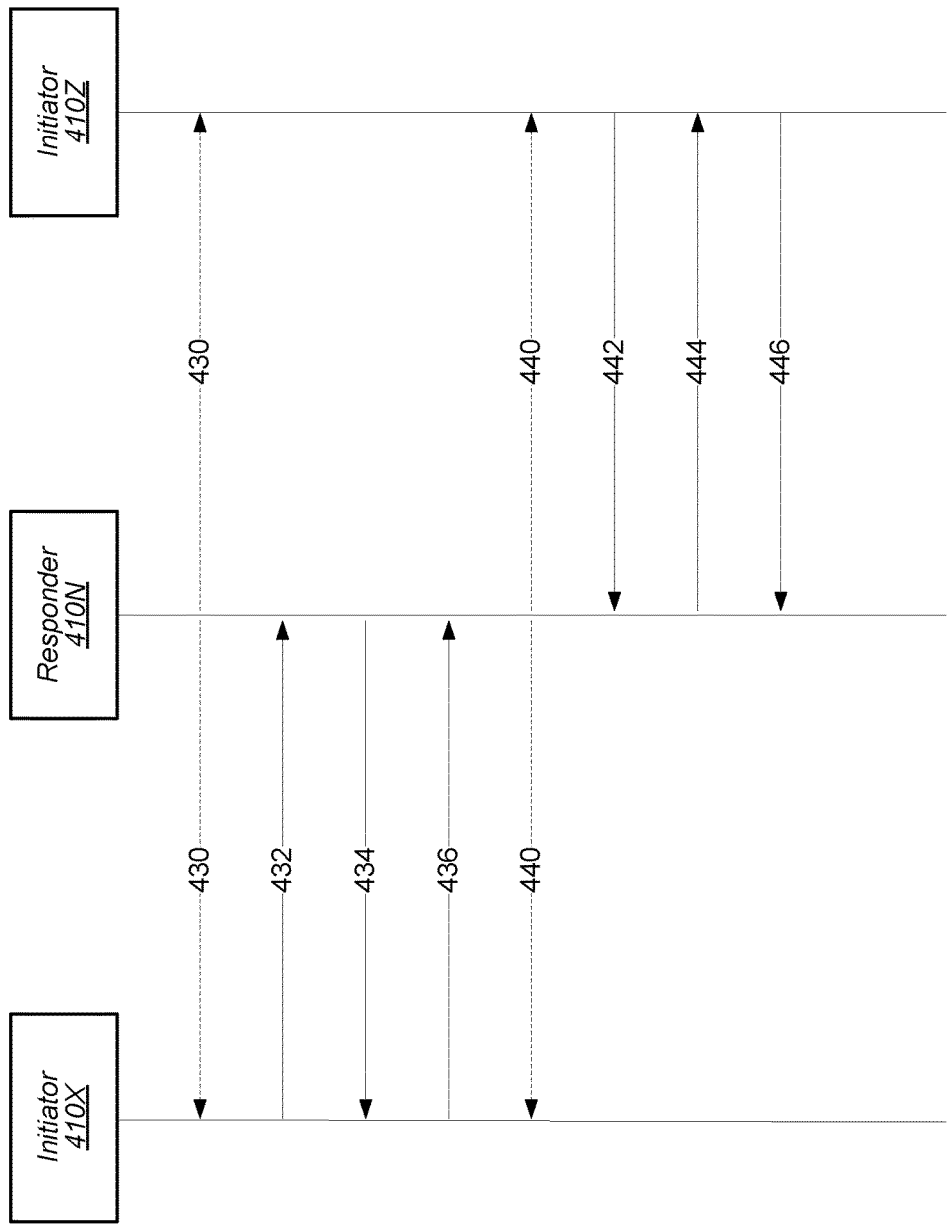
FIG. 4B illustrates an example of signaling between peer devices to establish schedules for peer-to-peer communications.

Thus, as illustrated by FIG. 4B, device 410N may transmit a beacon or publish message (e.g., beacon/message 430) that includes device 410N's potential availability. The beacon/publish message 430 may be received by multiple peers (e.g., devices 410X and 410Z). A first device, e.g., device 410X, may transmit a schedule request 432 for a peer-to-peer communication session that includes the device 410X's conditional availability and potential availability, which serves as an initial proposed schedule for the peer-to-peer communication with device 410N. Device 410N may then respond with a schedule request response 434 that includes device 410N's conditional and potential availability, which serves as a counter proposed schedule for the peer-to-peer communication with device 410X and, if device 410X accepts the counter proposed schedule, either partially or entirely, device 410X may respond with a schedule confirm message 436 that includes the device 410X's committed availability for the peer-to-peer communication session with device 410N. The accepted portion of the countered schedule may become device 410N's committed availability schedule.

Device 410N may then send a new beacon/publish message 440 that may include device 410N's committed and potential schedule (now including the committed schedule for the peer-to-peer communication session with device 410X). A second device, e.g., device 410Z may transmit a schedule request 442 and include device 410Z's conditional and potential availability, which serves as an initial proposed schedule for a peer-to-peer communication session with device 410N. Device 410N may then respond with a schedule response message 444 that may include device 410N's conditional, committed, and potential availability, which serves as a counter proposed schedule for the peer-to-peer communication session with device 410Z and, if device 410Z accepts the countered schedule, either partially or entirely, device 410Z may respond with a schedule confirm message 446 that may include the device 410Z's committed availability for the peer-to-peer communication session with device 410N. Device 410N's committed availability schedule is also updated based on the schedule confirmation message from device 410Z.

In current implementations, only one committed schedule is defined for all neighbor peer devices, however, a device may require more flexibility—e.g., to advertise different committed schedules to different kinds of devices, so that a device may cancel specific schedules for certain neighbor peer devices without affecting schedules with other devices. Thus, embodiments described herein further define types of availabilities devices may advertise for setup and/or maintenance of peer-to-peer communications sessions such as NAN datalinks.

In some embodiments, one or more subtypes of committed availability may be defined. For example, a device may advertise both non-cancelable and cancelable committed availabilities. In some embodiments, the cancelable committed availabilities may be advertised on a peer basis (e.g., only including cancelable committed availability for the particular peer) and/or broadcast to all peers with active datapaths (e.g., including cancelable committed availability for all peers with active datapath). In some embodiments, the non-cancelable committed availability may be transmitted (or broadcasted) to all peers with or without active datapaths.

In some embodiments, the one or more subtypes of committed availability may include a committed availability schedule for management frames, referred to herein as committed-M availability. The committed-M availability may indicate schedule slots (e.g., time windows and channels) a device commits to be present mainly for network management and/or pre-datalink operations, such as network synchronization, service discovery, datalink setup, and so forth. In some embodiments, a committed-M availability schedule may occupy a minimal (or very small) amount of available resource for a device. In some embodiments, committed-M availability may not be canceled at least until a next update of the committed-M availability, e.g., in order to ensure non-datalink peers may communicate with the device. In other words, committed-M availability may be considered non-cancelable in some embodiments.

In some embodiments, the one or more subtypes of committed availability may include a committed availability schedule for an individual peer, referred to herein as committed-I availability. The committed-I availability may indicate schedule slots (e.g., time windows and channels) a device commits to be present for an individual peer. In some embodiments, committed-I availability may be a superset of committed-M availability. In other words, a committed-I availability scheduled may include all of a device's committed-M availability schedule as well as additional schedule slots committed communication with the individual peer device. In addition, schedule slots (other than schedule slots that are included in committed-M availability) may be canceled dynamically, e.g., if the device and the individual peer device no longer require the scheduled slots. In other words, committed-I availability may be considered cancelable. In some embodiments, different committed-I availability schedules may be assigned to different peers. Additionally, a conditional availability schedule may be considered as a special committed-I availability schedule that may be used in datalink setup/negotiation with an individual peer.

In some embodiments, the one or more subtypes of committed availability may include a complete committed availability schedule, referred to herein as committed-C availability. The committed-C availability may be a superset of committed-M availability schedule and all committed-I availability schedules and may indicate a device's overall committed schedule slots (e.g., time windows and channels). In some embodiments, a device may determine to not maintain multiple committed-I schedules and may make all committed-I schedules match a common committed-C schedule, e.g., if a device has limited resources, among other factors.

FIG. 5 illustrates an example of schedule negotiations for a peer-to-peer communication session, according to embodiments. The signaling shown in FIG. 5 may be used in conjunction with any of the systems or devices shown in the above Figures, among other devices. In various embodiments, some of the signaling shown may be performed concurrently, in a different order than shown, or may be omitted. Additional signaling may also be performed as desired.

As illustrated, device 506N, which may be a client station, such as client station 106 as described above, may transmit a beacon or publish message 510 that may include device 506N's potential availability. The beacon/publish message 510 may be received by multiple peers (e.g., devices 506X and 506Z, which may also be a client station, such as client station 106 described above). A first device, e.g., device 506X, may transmit a schedule request 512 for a peer-to-peer communication session that may include device 506X's conditional availability and potential availability, which may serve as an initial proposed schedule for the peer-to-peer communication session with device 506N. Device 506N may then respond with a schedule request response 514 that may include device 506N's conditional and potential availability, which may serve as a counter proposed schedule for device 506X and if device 506X accepts the countered schedule, either partially or entirely, device 506X may respond with a schedule confirm message 516 that may include device 506X's committed availability, which can be a committed-I schedule for device 506N. The accepted portion of the countered schedule may become device 506N's committed availability schedule, which can be a committed-I schedule particular to (or associated with) device 506X.

Device 506N may then send a new beacon/publish message 520 that may include the device 506N's potential availability schedule and a committed-M availability schedule, which may target peers without an active datapath with device 506N. A second device, device 506Z may transmit a schedule request 522 and may include device 506Z's conditional and potential availability, which may serve as an initial proposed schedule for a peer-to-peer communication session with device 506N. Device 506N may then respond with a schedule response message 524 that may include device 506N's conditional, committed, and potential availability, which serves as a counter proposed schedule for device 506Z and if device 506Z accepts the counter proposed schedule, either partially or entirely, device 506Z may respond with a schedule confirm message 526 that may include device 506Z's committed availability, which can be a committed-I schedule particular to (or associated with) device 506N. Device 506N's committed availability schedules, including both the committed-I schedule for device 506Z and the committed-C schedule may also be updated based on the schedule confirmation message 526 from the device 506Z.

In some embodiments, changes to an availability type (e.g., potential, committed-M, committed-I, and/or committed-C) may be indicated by one or more indicators. For example, in some embodiments, a change in an availability schedule may be indicated by an increase in a sequence number associated with all availability schedules. For example, the sequence number may be incremented if there is a change to potential availability, a change to committed-C availability, and/or if any conditional availability is included in a scheduling negotiation or update message. In some embodiments, a scheduling negotiation or update message may include one or more attributes (or flags) that may indicate update to availability schedule types. For example, a first attribute may indicate a change to a potential availability schedule. In other words, a scheduling update message may include a potential update flag that may be set if there is any change to a potential availability schedule. As another example, a second attribute may indicate a change to a committed-C availability schedule or inclusion of a conditional availability schedule. In other words, a scheduling update message may include a committed update flag that may be set if there is any change to a committed-C availability schedule or there is any conditional availability schedule included.

In some embodiments, if a device maintains different committed-I availability schedules for different peer devices for which the device has a peer-to-peer communication session, the device may transmit availability schedule updates via a unicast message to each peer (e.g., a separate unicast message updating an associated committed-I availability schedule to a peer device associated with the committed-I availability schedule). In other words, the device may transmit a unicast availability update message to each peer device individually to update committed-I availabilities.

In some embodiments, if a device maintains a common committed-C availability schedule for peer devices for which the device has a peer-to-peer communication session, the device may transmit availability schedule updates via either unicast transmissions or a broadcast transmission. In other words, the device may transmit a unicast availability update message to each peer device individually or transmit a broadcast availability update message to the peer device to update committed-C availability.

In some embodiments, a device may include potential and committed-M availability schedules in broadcast messages such as beacons and/or publish/subscribe frames, e.g., with an intention to "hide" the cancelable committed schedules from some peers, particularly peers without active datapath with the device. In some embodiments, the device may include potential and committed-C availability schedules in such broadcast messages, but indicate which portion of the committed-C schedule is committed-M schedule.

In some embodiments, a device may not require an indication as to whether a received committed availability schedule from a peer device is a committed-I (e.g., for the device only) or a committed-C schedule. In either instance, the device may update current availability schedules for the peer device with the received availability schedules if a sequence number associated with the received schedules is greater than a sequence number associated with the current schedules and/or an update attribute(s) (or flag(s)) included with the received availability schedules indicate that the received availability schedules are updated. In some embodiments, a device may ignore (e.g., skip via not parsing and/or processing) a received availability schedule from a peer device if a sequence number associated with the received availability schedules is equivalent to a sequence number associated with the current schedules. In some embodiments, a device may ignore (e.g., skip via not parsing and/or processing) a received availability schedule type (e.g., potential availability or committed availability) from a peer device if the sequence number associated with the received availability schedules is one increment greater than the sequence number associated with the current availability schedules and an update attribute (or flag) corresponding to the received availability schedule type does not indicate that the received availability schedule type has been changed.

In some embodiments, if a device receives a message from a peer device that includes a potential availability update and a committed-M availability update and further includes an indication that a committed-C availability has changed, the device may wait for an update notification message with the a committed-C (or committed-I) availability update from the peer device and/or transmit a message to the peer device requesting the peer device to transmit the committed-C (or committed-I) availability update. In some embodiments, the indication may include an increase in a sequence number associated with the committed-C availability and/or an attribute (or flag) indicating that the committed-C availability of the peer device has changed.

In some embodiments, a change in availability may be classified into one more types of changes. For example, a first type (e.g., type 1) may indicate that a change conflicts with an existing (or current) committed availability schedule, e.g., changing to a different channel (or channels) and/or becoming unavailable during an existing committed slot. As another example, a second type (e.g., type 2) may indicate that a change adds additional conditional and/or committed availability slots (e.g., time windows and channels) without affecting existing committed availability slots. In some embodiments, a change may be effective (substantially/approximately) immediately or at a future point in time. For example, a change that is effective at a next schedule slot after a peer device receives an update indicating (or including) the change may be considered effective immediately (or approximately/substantially immediately). In some embodiments, a sequence number associated with the change (associated with an updated availability schedule) may be effective (approximately/substantially) immediately if the change is effective (approximately/substantially) immediately or may be effective at a future time corresponding to a future time when the change may become effective.

In some embodiments, a change that adds additional conditional and/or committed availability slots (e.g., type 2) may be effective (substantially/approximately) immediately if different peer devices receiving an update may receive the update at different times (e.g., via unicast and/or broadcast messages) and can individually decide whether to accept, reject, or counter propose the update since the update will not affect any existing peer-to-peer communication sessions. In some embodiments, a change that conflicts with an existing committed availability schedule (e.g., type 1) may be effective (substantially/approximately) immediately if the change affects a single peer device and the single peer device receives the change via a unicast message. In such instances, other peer devices may receive the update at different times (e.g., via unicast and/or broadcast messages) and decide whether to accept, reject, or counter propose the update since the update will not affect any existing peer-to-peer communication sessions between the other peer devices and a device transmitting the change. Note that in some embodiments, a change that conflicts with an existing committed availability schedule (e.g., type 1) may not be effective (substantially/approximately) immediately if the change affects multiple peers. In such instances, the change may be effective at a future time that allows affected peers time to receive the change.

Figure 6:
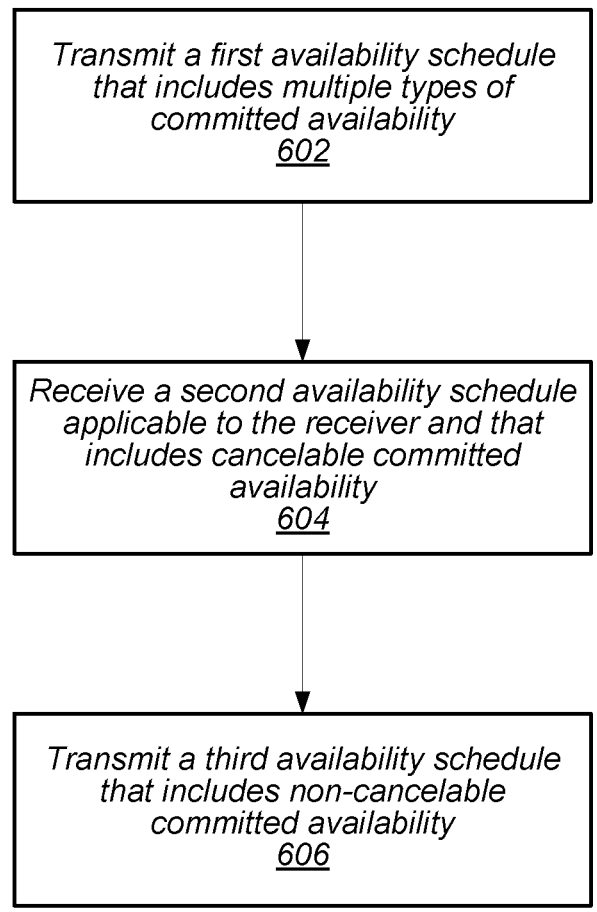
FIG. 6 illustrates a block diagram of an example of a method for negotiating a schedule for a peer-to-peer communication session, according to embodiments.

FIG. 6 illustrates a block diagram of an example of a method for negotiating a schedule for a peer-to-peer communication session, according to embodiments. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 602, a wireless station such as client station 106 may transmit, to a first peer wireless station of a plurality of peer wireless stations within transmission range of the wireless station (e.g., neighboring wireless stations), a first availability schedule that includes multiple types of committed availability, including a first type of committed availability (e.g., an indication of times and channels that the wireless station may be available for peer-to-peer communications) that may be non-cancelable and a second type of committed availability that may be cancelable. In some embodiments, the first availability schedule may be transmitted via a scheduling negotiation message. The scheduling negotiation message may include an attribute and the attribute may indicate a change to the one or more types of committed availability. In some embodiments, the change is one of a plurality of types of changes such as a first type of change that may indicate that the change conflicts with an existing committed availability schedule, and/or a second type of change that may indicate that the change adds additional conditional and/or committed availability. In some embodiments, the first availability schedule may be transmitted via one of a unicast message or a broadcast message.

At 604, a second availability schedule may be received from the first peer wireless station. The second availability schedule may applicable to the wireless station but not other peer wireless stations. In other words, the first peer wireless station may transmit an availability schedule that may be unique to the wireless station. In some embodiments, the second availability schedule may be the second type of committed availability (e.g., cancelable). In some embodiments, in response to determining that a first sequence number associated with the second availability schedule has increased compared to a second sequence number associated with a prior availability schedule associated with the first peer wireless station, the prior availability schedule may be updated to the second availability schedule. In some embodiments, in response to determining that a first sequence number associated with the second availability schedule has not increased compared to a second sequence number associated with a prior availability schedule associated with the first peer wireless station, the prior availability schedule may continue to be associated with the first peer wireless station.

At 606, a third availability schedule may be transmitted to a second peer wireless station. The third availability schedule may be the first type of committed availability (e.g., non-cancelable).

In some embodiments, a fourth availability schedule applicable to the first peer wireless station may be transmitted to the first peer wireless station. The fourth availability schedule may be the second type of committed availability (e.g., cancelable). In addition, a schedule confirmation message may be received from the first peer wireless station and may include at least a portion of the fourth availability schedule. In some embodiments, the fourth availability schedule may include conditional availability and potential availability of the wireless station. The conditional availability may include proposed time windows (e.g., times) and channels for communication with the first peer wireless station. The potential availability may include time windows and channels for receiving communications from the first peer wireless station that the wireless station prefers. In some embodiments, the potential availability may also include time windows and channels for receiving communications from the first peer wireless station that the wireless station does not prefer.

Figure 7:
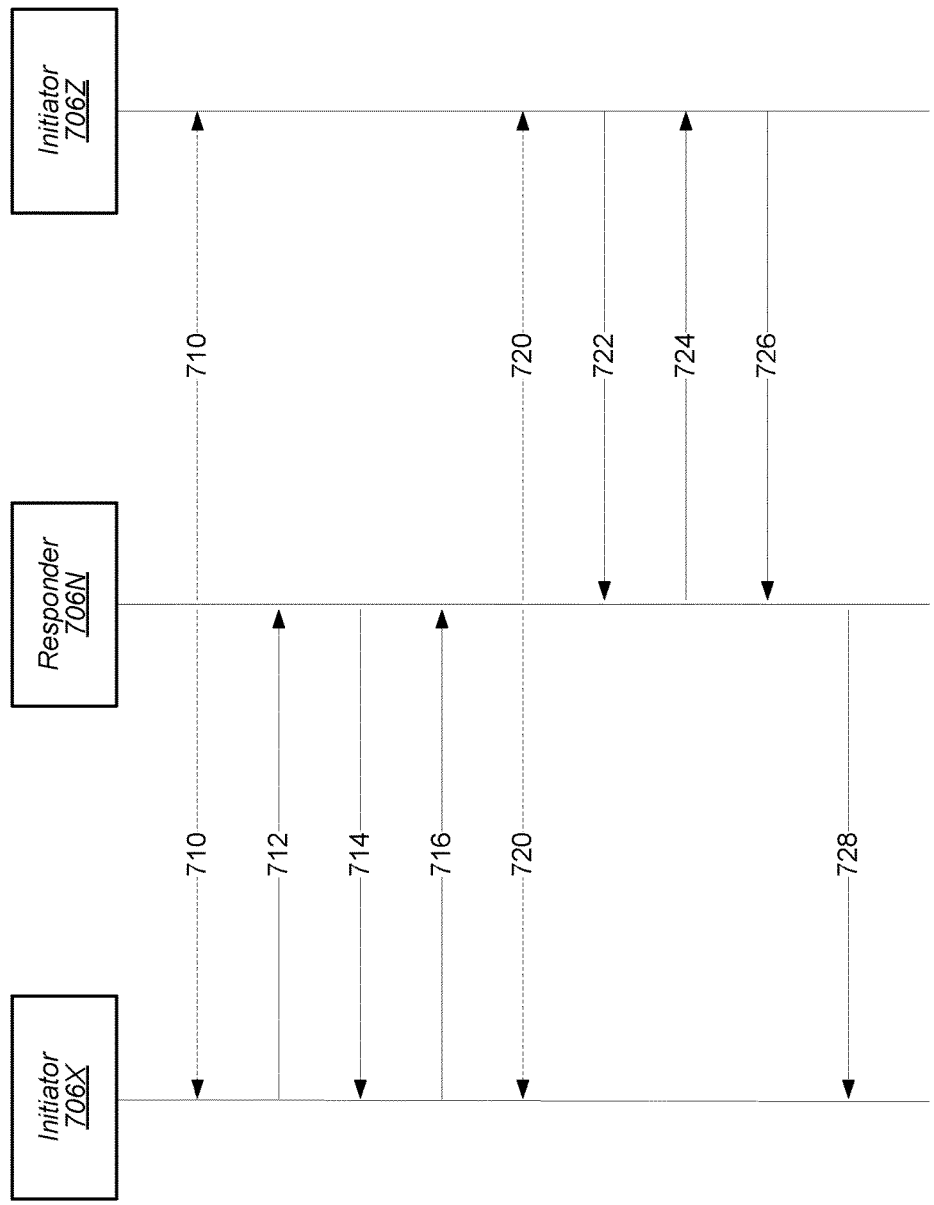
FIG. 7 illustrates an example of signaling between peer devices for a change that adds conditional and/or committed availability slots to an existing availability schedule, according to embodiments.

FIG. 7 illustrates an example of signaling between peer devices for a change that adds conditional and/or committed availability slots to an existing availability schedule, according to embodiments. The signaling shown in FIG. 7 may be used in conjunction with any of the systems or devices shown in the above Figures, among other devices. In various embodiments, some of the signaling shown may be performed concurrently, in a different order than shown, or may be omitted. Additional signaling may also be performed as desired.

As illustrated, a device, such as device 706N, which may be a client station such as client station 106 described above, may transmit a beacon or publish message 710 that may include a first schedule that may indicate device 706N's potential availability and a first sequence number associated with the first schedule transmitted in the beacon/publish message 710. The beacon/publish message 710 may be received by multiple peers (e.g., devices 706X and 706Z, which may also be client stations such as client station 106 described above). A first device, such as device 706X may transmit a schedule request 712 for a peer-to-peer communication session that includes device 706X's conditional availability and potential availability to device 706N. Device 706N may then respond with a schedule request response 714 (e.g., a counter proposal) that includes a second schedule that may indicate device 706N's conditional availability for device 706X, potential availability, and a second sequence number associated with the second schedule transmitted in the schedule request response message 714. The second sequence number may have been incremented as compared to the first sequence number. In some embodiments, if device 706X accepts the counter proposal for the schedule, either partially or entirely, device 706X may respond with a schedule confirm message 716 that may include the device 706X's committed availability, which can be a committed-I schedule for device 706N. The accepted portion of the counter proposal may become device 706N's committed availability schedule associated with the second sequence number. Device 706N may then send new beacon/publish messages 720 that include a third schedule that may indicate device 706N's committed-M availability, potential availability schedule, and the second sequence number.

A second device, such as device 706Z may transmit a schedule request 722 and include device 706Z's conditional and potential availability. Device 706N may then respond with a schedule response message 724 (e.g., a counter proposal) that includes a fourth schedule that may indicate device 706N's conditional availability for device 706Z, committed-I availability for device 706Z, potential availability, and a third sequence number. The third sequence number may have been incremented as compared to the second sequence number. In some embodiments, if device 706Z accepts the counter proposal for the schedule, either partially or entirely, device 706Z may respond with a schedule confirm message 726 that may include the device 706Z's committed availability, which can be a committed-I schedule for device 706N. Device 706N's committed availability schedules, including both the committed-I schedule for device 706Z and the committed-C schedule may also be updated based on the schedule confirmation message 726 received from device 706Z and associate the updated schedules to the third sequence number. Device 706N may then transmit a schedule update 728 to device 706X that includes device 706N's updated committed-I schedule for device 706X, potential availability, and the third sequence number.

Figure 8:
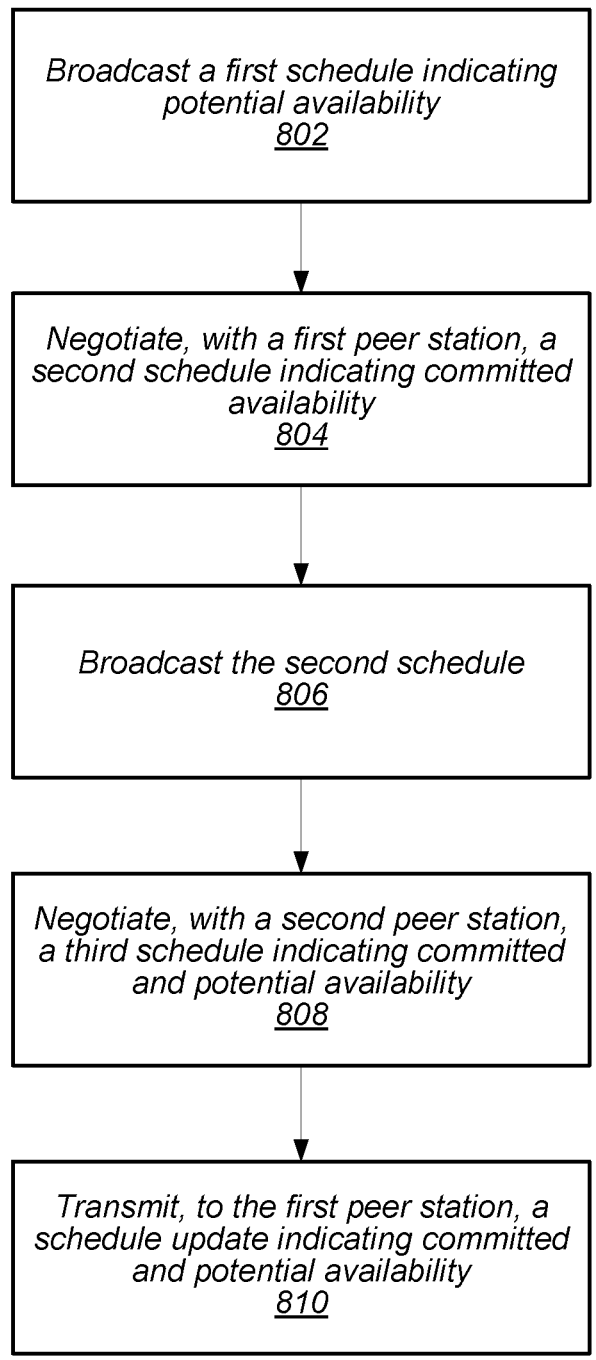
FIG. 8 illustrates a block diagram of an example of a method for negotiating a schedule change that adds conditional and/or committed availability slots to an existing availability schedule, according to embodiments.

FIG. 8 illustrates a block diagram of an example of a method for negotiating a schedule change that adds conditional and/or committed availability slots to an existing availability schedule, according to embodiments. The method shown in FIG. 8 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 802, a wireless station, such as client station 106, may broadcast, to one or more neighboring wireless stations (e.g., peer stations within communication range of the wireless station), a first message that may include a first schedule and a first sequence number that may be associated with the first schedule. The first schedule may indicate times (e.g., time windows) and channels of potential availability for peer-to-peer communication with at least one of the one or more neighboring wireless stations.

At 804, a second schedule indicating committed availability may be negotiated with a first neighboring wireless station of the one or more neighboring wireless stations. The second schedule may include times and channels of committed availability for peer-to-peer communications with the first neighboring wireless station (e.g., committed-I availability) and may be associated with a second sequence number. In some embodiments, the second sequence number may be an increment of the first sequence number.

In some embodiments, negotiating the second schedule may include receiving, from the first neighboring wireless station, a schedule request that includes the first neighboring wireless station's conditional availability and potential availability. Negotiating may also include, transmitting, responsive to the schedule request, a first schedule request response message that may include a schedule proposal and the second sequence number associated with the schedule proposal. The schedule proposal may indicate times and channels of conditional availability for peer-to-peer communications with the first neighboring wireless station. Further, a schedule confirm message may be received from the first neighboring wireless station and may include the second schedule. The schedule confirm message may also indicate at least partial acceptance of the schedule proposal by the first neighboring wireless station. Additionally, the second sequence number may be associated with the second schedule.

At 806, the second schedule may be broadcast to the one or more neighboring wireless stations. In some embodiments, the second schedule may be broadcast in a second message that includes the second schedule and the second sequence number associated.

At 808, a third schedule may be negotiated with a second neighboring wireless station of the one or more neighboring wireless stations. In some embodiments, the third schedule may include times and channels of committed availability and potential availability for peer-to-peer communications with the second neighboring wireless station. In other words, the third schedule may indicate potential and committed availability of the wireless station. In some embodiments, the third schedule may be associated with a third sequence number. In some embodiments, the third sequence number may be an increment of the second sequence number.

In some embodiments, negotiating the third schedule may include receiving, from the second neighboring wireless station, a second schedule request indicating times and channels of conditional and potential availability of the second neighboring wireless station. In addition, a second schedule request response message that may include a schedule proposal may be transmitted to the second neighboring wireless station. The schedule proposal may indicate times and channels for at least committed availability for peer-to-peer communications with the second neighboring wireless station. Additionally, a schedule confirm message may be received from the second neighboring wireless station. The schedule confirm message may include the third schedule and may indicate at least partial acceptance of the schedule proposal by the second neighboring wireless station. In some embodiments, the third schedule may be associated with the third sequence number.

At 810, a schedule update may be transmitted to the first neighboring wireless station. In some embodiments, the schedule update may include the third sequence number, a committed availability schedule (e.g., a committed-I availability schedule) for peer-to-peer communications with the first neighboring wireless station, and a potential availability schedule.

Figure 9:
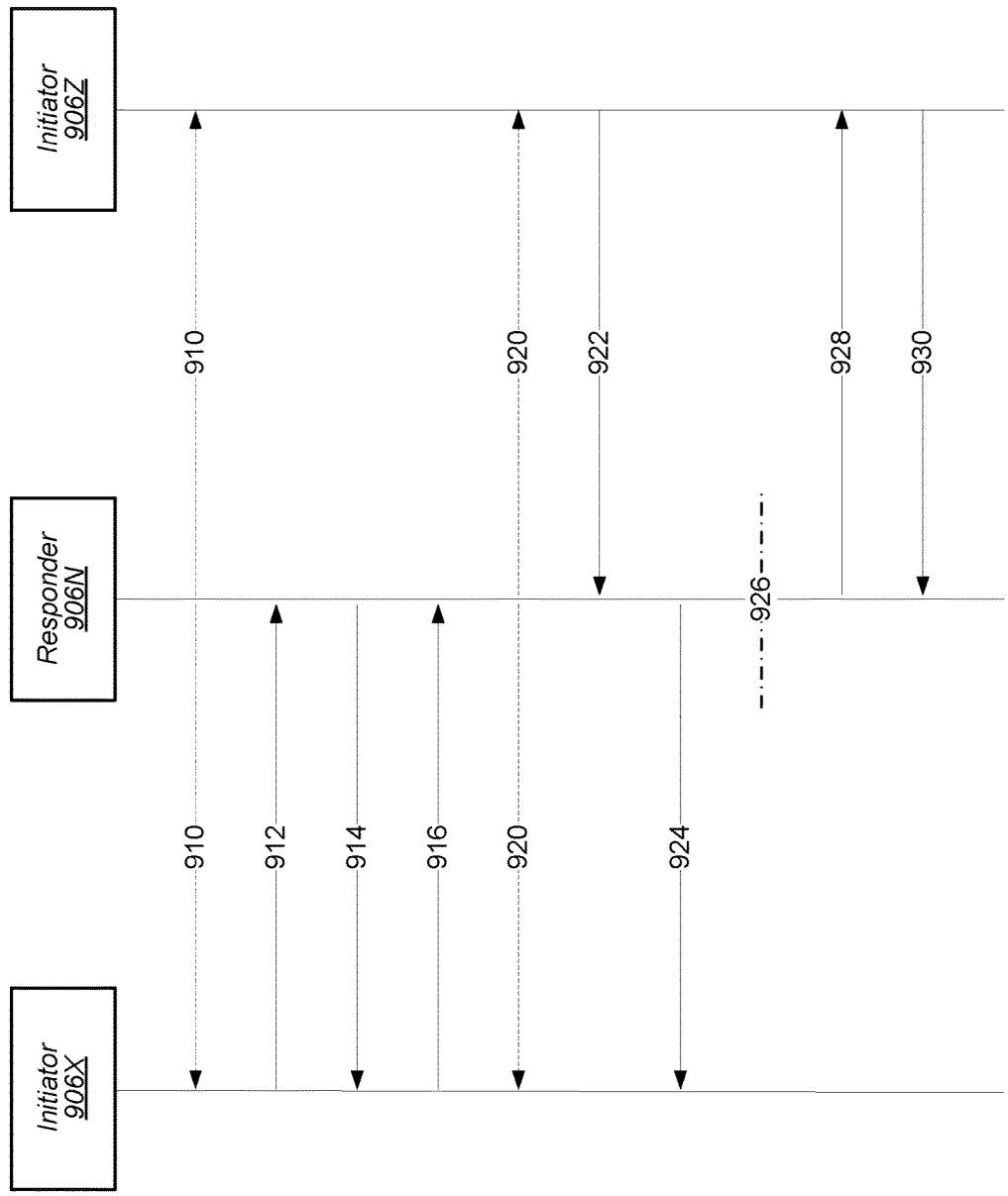
FIG. 9 illustrates an example of signaling between peer devices for a change that conflicts with an existing availability schedule and affects multiple peers, according to embodiments.

FIG. 9 illustrates an example of signaling between peer devices for a change that conflicts with an existing availability schedule and affects multiple peers, according to embodiments. The signaling shown in FIG. 9 may be used in conjunction with any of the systems or devices shown in the above Figures, among other devices. In various embodiments, some of the signaling shown may be performed concurrently, in a different order than shown, or may be omitted. Additional signaling may also be performed as desired.

As illustrated, a device, such as device 906N, which may be a client station such as client station 106, may transmit a beacon or publish message 910 that may include a first schedule and a first sequence number associated with the first schedule. The first schedule may indicate device 906N's potential availability. The beacon/publish message 910 may be received by multiple peers, such as devices 906X and 906Z, which may also be client stations, such as client station 106. A first device, e.g., device 906X, may respond with a schedule request 912 for a peer-to-peer communication session that includes device 906X's conditional availability and potential availability. Device 906N) may then respond with a schedule request response 914 (e.g., a counter proposal) that includes a second schedule that may indicate device 906N's conditional availability for device 906X, potential availability, and a second sequence number that may be associated with the second schedule. The second sequence number may have been incremented as compared to the first sequence number. In some embodiments, if device 906X accepts the counter proposal for the schedule, either partially or entirely, it may respond with a schedule confirm message 916 that may include device 906X's committed availability, which can be a committed-I schedule for device 906N. The accepted portion of the counter proposal for the schedule may become device 906N's committed availability schedule associated with the second sequence number. Device 906N may then send new beacon/publish messages 920 that include device 906N's committed-M availability, potential availability schedule, and the second sequence number.

A second device, e.g., device 906Z, may transmit a schedule request 922 and include device 906Z's conditional and potential availability. In some embodiments, if device 906N determines to establish a datapath with device 906Z, but needs to change its existing committed schedule to accommodate the device 906Z's potential and conditional availability schedules, the device may first update existing peers (e.g. device 906X with the new committed schedules. For example, device 906N may transmit a schedule update message 924 to device 906X that includes device 906N's updated committed-I availability for device 906X, potential availability, a third sequence number, and an effective time 926. The third sequence number may have been incremented as compared to the second sequence number. In some embodiments, device 906N may transmit another schedule update to a third device that includes device 906N's updated committed-I availability for the third device, potential availability, the third sequence number, and the effective time 926. Once the update becomes effective (e.g., at the effective time, 926), device 906N may then transmit a schedule response message 928 (e.g., a counter proposal for the schedule) to device 906Z that includes the device's conditional availability for device 906Z, committed-I availability for device 906Z, potential availability, and the third sequence number. In some embodiments, if device 906Z accepts the counter proposal for the schedule, either partially or entirely, the second device may respond with a schedule confirm message 930 that may include the device 906Z's committed availability, which can be a committed-I schedule for device 906N.

Figure 10:
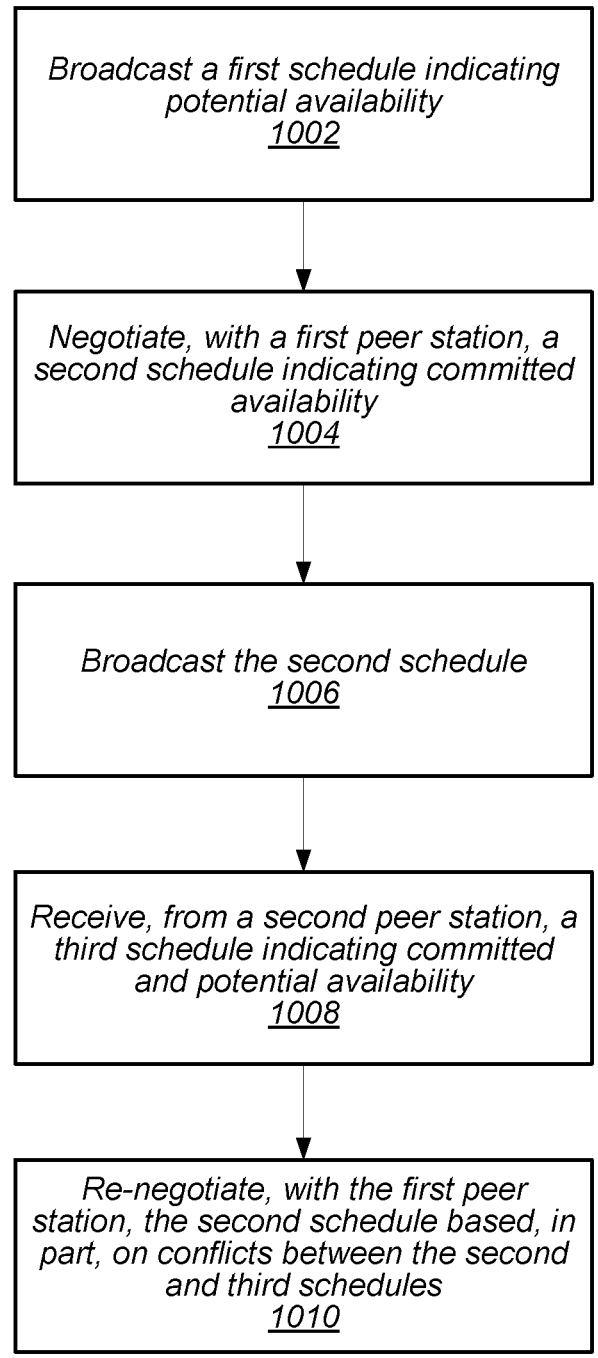
FIG. 10 illustrates a block diagram of an example of a method for negotiating a schedule a change that conflicts with an existing availability schedule and affects multiple peers, according to embodiments.

FIG. 10 illustrates a block diagram of an example of a method for negotiating a schedule a change that conflicts with an existing availability schedule and affects multiple peers, according to embodiments. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, a wireless station, such as client station 106, may broadcast, to one or more neighboring wireless stations (e.g., peer stations within communication range of the wireless station), a first message that may include a first schedule and a first sequence number that may be associated with the first schedule. The first schedule may indicate times (e.g., time windows) and channels of potential availability for peer-to-peer communication with at least one of the one or more neighboring wireless stations.

At 1004, a second schedule indicating committed availability may be negotiated with a first neighboring wireless station of the one or more neighboring wireless stations. The second schedule may include times and channels of committed availability for peer-to-peer communications with the first neighboring wireless station (e.g., committed-I availability) and may be associated with a second sequence number. In some embodiments, the second sequence number may be an increment of the first sequence number.

In some embodiments, negotiating the second schedule may include receiving, from the first neighboring wireless station, a schedule request that includes the first neighboring wireless station's conditional availability and potential availability. Negotiating may also include, transmitting, responsive to the schedule request, a first schedule request response message that may include a schedule proposal and the second sequence number associated with the schedule proposal. The schedule proposal may indicate times and channels of conditional availability for peer-to-peer communications with the first neighboring wireless station. Further, a schedule confirm message may be received from the first neighboring wireless station and may include the second schedule. The schedule confirm message may also indicate at least partial acceptance of the schedule proposal by the first neighboring wireless station. Additionally, the second sequence number may be associated with the second schedule.

At 1006, the second schedule may be broadcast to the one or more neighboring wireless stations. In some embodiments, the second schedule may be broadcast in a second message that includes the second schedule and the second sequence number associated.

At 1008, a third schedule from a second neighboring wireless station of the one or more neighboring wireless stations. In some embodiments, the third schedule may include times and channels of committed availability and potential availability for peer-to-peer communications with the second neighboring wireless station. In other words, the third schedule may indicate potential and committed availability of the wireless station. In some embodiments, the third schedule may be associated with a third sequence number. In some embodiments, the third sequence number may be an increment of the second sequence number.

At 1010, the second schedule may be re-negotiated with the first neighboring wireless station. The re-negotiation may be based, at least in part, on the third schedule conflicting with the second schedule. In some embodiments, re-negotiating the second schedule may include transmitting a schedule update message to the first neighboring wireless station. The schedule update message may include a fourth schedule indicating times and channels of committed availability for peer-to-peer communications with the first neighboring wireless station, potential availability, a third sequence number, and an effective time of the fourth schedule.

In some embodiments, negotiating the third schedule may include transmitting, to the second neighboring wireless station, a schedule request response message. The schedule request response message may include a proposed schedule and the third sequence number associated with the proposed schedule. The proposed schedule may indicate times and channels for at least committed availability for peer-to-peer communications with the second neighboring wireless station. In some embodiments, the schedule request response message may be transmitted after an effective time of the re-negotiated second schedule. In some embodiments, a schedule confirm message may be received from the second neighboring wireless station. The schedule confirm message may include the third schedule and indicates at least partial acceptance of the schedule proposal by the second neighboring wireless station. In addition, the third schedule may be associated with the third sequence number.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio in communication with the at least one antenna and configured to perform communications via a Wi-Fi interface; and
   at least one processor in communication with to the at least one radio;
   wherein the at least one processor is configured to cause the wireless station to:
   transmit, to a first peer wireless station of a plurality of peer wireless stations within transmission range of the wireless station, a first availability schedule via a scheduling negotiation message, wherein the first availability schedule comprises one or more types of committed availability, wherein a first type of committed availability is non-cancelable and a second type of committed availability is cancelable, wherein the scheduling negotiation message includes an attribute indicating a change to the one or more types of committed availability, and wherein the change is one of a plurality of types of changes comprising a first type of change indicating that the change conflicts with an existing committed availability schedule and a second type of change indicating that the change adds additional conditional availability, additional committed availability, or additional conditional availability and additional committed availability;
   receive, from the first peer wireless station, a second availability schedule applicable to the wireless station but not applicable to other peer wireless stations, wherein the second availability schedule comprises the second type of committed availability; and
   transmit, to a second peer wireless station of the plurality of peer wireless stations, a third availability schedule comprising the first type of committed availability.

2. The wireless station of claim 1,
wherein the at least one processor is configured to cause the wireless station to:
  transmit, to the first peer wireless station, a fourth availability schedule comprising the second type of committed availability; and
  receive, from the first peer wireless station, a schedule confirmation message comprising at least a portion of the fourth availability schedule.

3. The wireless station of claim 2,
wherein the fourth availability schedule comprises conditional availability and potential availability of the wireless station, the conditional availability comprising proposed time windows and channels for communication with the first peer wireless station, and the potential availability comprising time windows and channels that the wireless station prefers for receiving communications from the first peer wireless station.

4. The wireless station of claim 3,
wherein the potential availability further comprises time windows and channels for receiving communications from the first peer wireless station that the wireless station does not prefer.

5. The wireless station of claim 1,
wherein the first availability schedule is transmitted via one of a unicast message or a broadcast message.

6. The wireless station of claim 1,
wherein the at least one processor is further configured to cause the wireless station to:
  update the first availability schedule to the second availability schedule in response to determining that a first sequence number associated with the second availability schedule has increased compared to a second sequence number associated with a prior availability schedule associated with the first peer wireless station.

7. The wireless station of claim 1,
wherein the at least one processor is further configured to cause the wireless station to:
  continue to associate the first availability schedule with the first peer wireless station in response to determining that a first sequence number associated with the second availability schedule has not increased compared to a second sequence number associated with a prior availability schedule associated with the first peer wireless station.

8. An apparatus, comprising:
a memory; and
at least one processor in communication with the memory, wherein the at least one processor is configured to:
  generate instructions to broadcast, to one or more neighboring wireless stations during a first negotiation window, a first message comprising a first schedule and a first sequence number associated with the first schedule, wherein the first schedule indicates times and channels of potential availability for peer-to-peer communication with at least one of the one or more neighboring wireless stations;
  negotiate, with a first neighboring wireless station of the one or more neighboring wireless stations during a second negotiation window, a second schedule comprising times and channels of committed availability for peer-to-peer communications with the first neighboring wireless station, wherein the second schedule is associated with a second sequence number;
  generate instructions to broadcast, to the one or more neighboring wireless stations during a third negotiation window, a second message comprising the second schedule and the second sequence number associated with the second schedule;
  negotiate, with a second neighboring wireless station of the one or more neighboring wireless stations during a fourth negotiation window, a third schedule comprising times and channels of committed availability and potential availability for peer-to-peer communications with the second neighboring wireless station, wherein the third schedule is associated with a third sequence number; and
  generate instructions to transmit, to the first neighboring wireless station during a window based on the second schedule, a schedule update comprising the third sequence number, a committed availability schedule for peer-to-peer communications with the first neighboring wireless station, and a potential availability schedule.

9. The apparatus of claim 8,
wherein, to negotiate the second schedule, the at least one processor is further configured to:
  receive, from the first neighboring wireless station, a schedule request comprising the first neighboring wireless station's conditional availability and potential availability;
  generate instructions to transmit, to the first neighboring wireless station, a first schedule request response message comprising a fourth schedule and the second sequence number associated with the fourth schedule, wherein the fourth schedule indicates times and channels of conditional availability for peer-to-peer communications with the first neighboring wireless station;
  receive, from the first neighboring wireless station, a schedule confirm message, wherein the schedule confirm message comprises the second schedule and indicates at least partial acceptance of the fourth schedule; and
  associate the second schedule with the second sequence number.

10. The apparatus of claim 8,
wherein, to negotiate the third schedule, the at least one processor is further configured to:
  receive, from the second neighboring wireless station, a second schedule request indicating times and channels of conditional and potential availability of the second neighboring wireless station;
  generate instructions to transmit, to the second neighboring wireless station, a second schedule request response message comprising a fourth schedule and the third sequence number associated with the fourth schedule, wherein the fourth schedule indicates times and channels for at least committed availability for peer-to-peer communications with the second neighboring wireless station;
  receive, from the second neighboring wireless station, a schedule confirm message, wherein the schedule confirm message comprises the third schedule and indicates at least partial acceptance of the fourth schedule by the second neighboring wireless station; and
  associate the third schedule with the third sequence number.

11. The apparatus of claim 8,
wherein the second sequence number is generated by incrementing the first sequence number.

12. The apparatus of claim 8,
wherein the third sequence number is generated by incrementing the second sequence number.

13. The apparatus of claim 8,
wherein the first schedule is transmitted via a scheduling negotiation message, wherein the first schedule further indicates times and channels of one or more types of committed availability, wherein the scheduling negotiation message includes an attribute indicating a change to the one or more types of committed availability, and wherein the change is one of a plurality of types of changes comprising a first type of change indicating that the change conflicts with an existing committed availability schedule and a second type of change indicating that the change adds additional conditional availability, additional committed availability, or additional conditional availability and additional committed availability.

14. A non-transitory computer readable memory medium storing program instructions executable by processing circuitry of a wireless station to:
generate instructions to broadcast, to one or more neighboring wireless stations during a first negotiation window, a first message comprising a first schedule and a first sequence number associated with the first schedule, wherein the first schedule indicates times and channels of potential availability for peer-to-peer communication with at least one of the one or more neighboring wireless stations;
negotiate, with a first neighboring wireless station of the one or more neighboring wireless stations during a second negotiation window, a second schedule, wherein the second schedule comprises times and channels of committed availability for peer-to-peer communications with the first neighboring wireless station and is associated with a second sequence number;
generate instructions to broadcast, to the one or more neighboring wireless stations during a third negotiation window, a second message comprising the second schedule and the second sequence number;
receive, from a second neighboring wireless station of the one or more neighboring wireless stations during a fourth negotiation window, a third schedule comprising times and channels of committed availability and potential availability for peer-to-peer communications with the second neighboring wireless station; and
re-negotiate, with the first neighboring wireless station during a window based on the second schedule, the second schedule based on a conflict between the third schedule and the second schedule.

15. The non-transitory computer readable memory medium of claim 14,
wherein the program instructions are further executable to:
negotiate, with the second neighboring wireless station, the third schedule associated with a third sequence number.

16. The non-transitory computer readable memory medium of claim 15,
wherein, to negotiate the third schedule, the program instructions are further executable to:
generate instructions to transmit, to the second neighboring wireless station, a schedule request response message comprising a proposed schedule and the third sequence number, wherein the proposed schedule indicates times and channels for at least committed availability for peer-to-peer communications with the second neighboring wireless station;
receive, from the second neighboring wireless station, a schedule confirm message comprising the third schedule and indicating at least partial acceptance of the proposed schedule by the second neighboring wireless station; and
associate the third schedule with the third sequence number.

17. The non-transitory computer readable memory medium of claim 16,
wherein, the schedule request response message is transmitted after an effective time of the re-negotiated second schedule.

18. The non-transitory computer readable memory medium of claim 14,
wherein, to re-negotiate the second schedule, the program instructions are further executable to:
generate instructions to transmit, to the first neighboring wireless station, a schedule update message comprising a fourth schedule indicating times and channels of committed availability for peer-to-peer communications with the first neighboring wireless station, potential availability, a third sequence number, and an effective time of the fourth schedule.

19. The non-transitory computer readable memory medium of claim 18,
wherein the third sequence number is generated by incrementing the second sequence number.

20. The non-transitory computer readable memory medium of claim 14,
wherein the first schedule is transmitted via a scheduling negotiation message, wherein the first schedule further indicates times and channels of one or more types of committed availability, wherein the scheduling negotiation message includes an attribute indicating a change to the one or more types of committed availability, and wherein the change is one of a plurality of types of changes comprising a first type of change indicating that the change conflicts with an existing committed availability schedule and a second type of change indicating that the change adds additional conditional availability, additional committed availability, or additional conditional availability and additional committed availability.

* * * * *